US011308685B2

(12) United States Patent
Hazra et al.

(10) Patent No.: US 11,308,685 B2
(45) Date of Patent: Apr. 19, 2022

(54) RENDERING COMPUTER-GENERATED REALITY TEXT

(71) Applicant: Apple Inc., Cupertino, CA (US)

(72) Inventors: Siddharth S. Hazra, Milpitas, CA (US); William J. Dobbie, Sunnyvale, CA (US); Moinul H. Khan, San Jose, CA (US); Yanli Zhang, Los Altos, CA (US); Yohan Rajan, Cupertino, CA (US); Arthur Y. Zhang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/028,887

(22) Filed: Sep. 22, 2020

(65) Prior Publication Data

US 2021/0090323 A1 Mar. 25, 2021

Related U.S. Application Data

(60) Provisional application No. 62/904,073, filed on Sep. 23, 2019.

(51) Int. Cl.
*G06T 15/20* (2011.01)
*G06T 7/73* (2017.01)
(Continued)

(52) U.S. Cl.
CPC ............. *G06T 15/20* (2013.01); *G06F 3/013* (2013.01); *G06T 7/74* (2017.01); *G06T 19/006* (2013.01);
(Continued)

(58) Field of Classification Search
CPC ......... G06T 15/20; G06T 7/74; G06T 19/006; G06T 2207/30244; G06T 2219/004; G06F 3/013
See application file for complete search history.

(56) References Cited

U.S. PATENT DOCUMENTS 9,852,506 B1 12/2017 Starner et al.
9,978,182 B2 5/2018 Yeoh et al.
(Continued)

OTHER PUBLICATIONS

PCT, European Patent Office (ISA/EP), International Search Report and Written Opinion of the International Searching Authority, International Application No. PCT/US2020/051151, 12 pages (dated Dec. 23, 2020).

*Primary Examiner* — Chong Wu
(74) *Attorney, Agent, or Firm* — Thompson Hine LLP

(57) ABSTRACT

Various implementations disclosed herein include devices, systems, and methods that dynamically-size zones used in foveated rendering of content that includes text. In some implementations, this involves adjusting the size of a first zone, e.g., a foveated gaze zone (FGZ), based on the apparent size of text from a viewpoint. For example, a FGZ may be increased or decreased in width, height, diameter, or other size attribute based on determining an angle subtended by one or more individual glyphs of the text from the viewpoint. Various implementations disclosed herein include devices, systems, and methods that select a text-rendering algorithm based on a relationship between (a) the rendering resolution of a portion of an image corresponding to a part of a glyph and (b) the size that the part of the glyph will occupy in the image.

20 Claims, 12 Drawing Sheets

(51) Int. Cl.
*G06F 3/01* (2006.01)
*G06T 19/00* (2011.01)

(52) U.S. Cl.
CPC ............... *G06T 2207/30244* (2013.01); *G06T 2219/004* (2013.01)

(56) References Cited

U.S. PATENT DOCUMENTS

| | | |
|---|---|---|
| 10,043,238 B2 | 8/2018 | Bean et al. |
| 10,127,706 B2 | 11/2018 | Jones et al. |
| 2017/0287446 A1* | 10/2017 | Young ................... G06F 3/013 |
| 2017/0287466 A1 | 10/2017 | Young et al. |
| 2017/0372457 A1 | 12/2017 | Sylvan et al. |
| 2018/0275410 A1 | 9/2018 | Yeoh et al. |
| 2019/0180421 A1 | 6/2019 | Kim et al. |

* cited by examiner

RENDERING COMPUTER-GENERATED REALITY TEXT

CROSS-REFERENCE TO RELATED APPLICATION

This application claims the benefit of U.S. Provisional Application Ser. No. 62/904,073 filed Sep. 23, 2019, which is incorporated herein in its entirety.

TECHNICAL FIELD

The present disclosure generally relates to rendering electronic content for display, and in particular, to systems, methods, and devices for rendering content that includes text.

BACKGROUND

Existing rendering techniques may not accurately and efficiently render content that include text and may include noticeable issues in rendering content that includes text using existing foveated rendering techniques.

SUMMARY

Various implementations disclosed herein include devices, systems, and methods that dynamically-size zones used in foveated rendering of content that includes text. As used herein, the phrase "text" refers to any visual elements that correspond to a system of writing, alphabet, code (e.g., Morse code), script, or symbols (e.g., a radiation hazard symbol), etc. In some implementations, dynamically sizing zones involves adjusting the size of a first zone, e.g., a foveated gaze zone (FGZ), based on the apparent size of text from a viewpoint. For example, a FGZ may be increased or decreased in width, height, diameter, or other size attribute based on determining an angle subtended by one or more individual glyphs of the text from the viewpoint.

Some implementations involve a method of dynamically sizing zones used in foveated rendering via a device having a processor. For example, the processor may execute instructions stored in a non-transitory computer-readable medium to perform a method. The method determines a viewpoint of a computer-generated reality (CGR) environment that includes text. In some implementations, a viewpoint is determined based on tracking the pose (e.g., position and orientation) of a head mounted device (HMD) or other device that will present a view of the CGR environment. The method determines a measurement associated with viewing the text from the viewpoint in the CGR environment. For example, the method may determine an angle subtended by one or more individual glyphs. Such an angle depends upon the distance of the text from viewpoint and the text size and thus provides a measure of the apparent size of the text from the viewpoint.

Based on the measurement associated with viewing text from the viewpoint, the method determines a size (e.g., diameter, width, height, etc.) of a first zone based on the measurement. For example, the width of a FGZ centered on the user's current gaze direction may be based on the size of a predetermined number of glyphs, e.g., the FGZ width may correspond to the width of a predetermined number of glyphs (e.g., 28 glyphs) given the determined or average size of glyphs in the text. Accordingly, for different glyph sizes (e.g., corresponding to different sizes in an image plane), the FGZ will be given different sizes corresponding to the width of the predetermined number of glyphs.

The method renders an image providing a view of the CGR environment from the viewpoint by rendering content in the first zone (e.g., foveated gaze zone/FGZ) according to a first rendering technique and rendering content in a second zone (e.g., the parafoveal zone) according to a second rendering technique. The first zone is distinct from the second zone and the first rendering technique is different from the second rendering technique. Since the size of the FGZ depends on the measurement associated with viewing the text (e.g., upon the angle subtended by one or more individual glyphs from the viewpoint), the size of the FGZ is variable and may adjust depending upon the particular circumstances (e.g., given the current text size and current viewpoint). Moreover, rendering in different zones using different rendering techniques enables foveated rendering. Since the size of the zones may adjust over time as circumstances (e.g., text size or viewpoint) change, the foveated rendering is dynamic.

Various implementations disclosed herein include devices, systems, and methods that select a text-rendering algorithm based on a relationship between (a) the rendering resolution of a portion of an image corresponding to a part of a glyph and (b) the size that the part of the glyph will occupy in the image. Thus, an "e" in a FGZ may be rendered using an expensive algorithm while the same "e" of the same size in a parafoveal zone may be rendered using an inexpensive algorithm.

Some implementations involve a method of selecting a text-rendering algorithm via a device having a processor. For example, the processor may execute instructions stored in a non-transitory computer-readable medium to perform a method. The method determines a viewpoint of a CGR environment that includes text and determines a rendering resolution for a portion of an image that will provide a view of the CGR environment from the viewpoint. In some implementations, different zones of the image have different rendering resolutions. In some implementations, the portion of the image is all of the image and thus the image has a single zone and rendering resolution.

The method determines a rendering technique for a part of a glyph based on an area that the part of the glyph will occupy in the portion of the image and the rendering resolution for the portion of the image. For example, this may involve (a) determining an area of the image that the part of the glyph will occupy, (b) determining the number of rendering pixels of the area according to the rendering resolution, and (c) selecting the rendering technique based on the number of rendering pixels (e.g., pixels per glyph or pixels per part of a glyph). For example, in a first circumstance, a part of a glyph will occupy an area of 10 pixels by 10 pixels (e.g., 100 pixels) where the rendering resolution is the actual display resolution. Accordingly, the method may determine that there are 100 rendering pixels for the glyph portion and select a first rendering technique accordingly. In contrast, in a second circumstance, the part of a glyph will occupy the same area of 10 pixels by 10 pixels (e.g., 100 pixels) where the rendering resolution may be ½ of the actual display resolution. Accordingly, the method may determine that there are 5 rendering pixels by 5 rendering pixels (e.g., 25 rendering pixels) and select a second rendering technique accordingly. The first rendering technique may provide a higher quality appearance but may be more expensive in terms of computational requirements, execution time, or power consumption than the second rendering technique.

The method renders the image providing the view of the CGR environment from the viewpoint. The part of the glyph is rendered according the selected rendering technique. Moreover, different parts of the same glyph and parts of other glyphs may similarly be rendered according to rendering techniques selected based on the circumstances of each part. In this way, an image may be rendered by selectively using different text rendering techniques on different glyphs or glyph parts that depend upon the circumstances (e.g., glyph size, glyph attributes, rendering resolution, etc.).

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
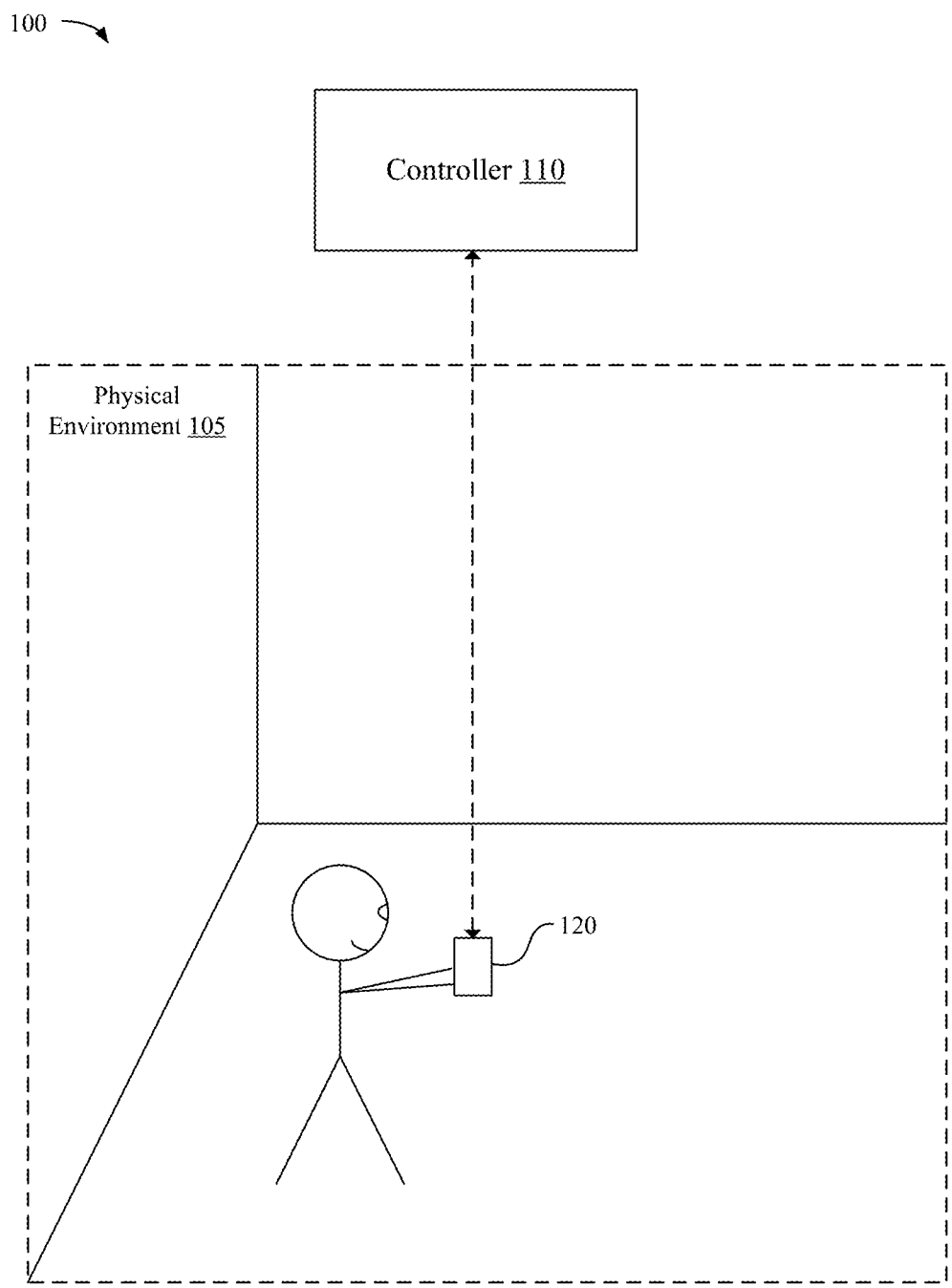
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Rendering refers to the generation of an image for display on an electronic device from a model or description of a 2D or 3D environment. A color value for each of a display's pixels is determined by examining the 2D or 3D environment. This may be achieved, for example, by using rays projected from a viewpoint (e.g., a virtual camera position) through pixels of an image plane to hit objects in the environment. The rays obtain information about the objects (e.g., color) for the display's pixels. Such processes may be referred to as "sampling" the pixels in a virtual camera's image plane. Higher sampling rates may provide a higher quality appearance but may require increased workload (e.g., processing time, transmission requirements, and power requirements).

Foveated rendering uses eye tracking to reduce rendering workload by reducing image quality (e.g., sampling rate) in the vision areas that are outside of the user's gaze zone. While human vision may cover over 160 degrees horizontally and over 135 degrees vertically, it may perceive details only within about 5 degrees around the current gaze direction. Acuity falls off rapidly with angular distance away from the central gaze direction. Existing foveated rendering techniques render to nested zones centered around the gaze direction using different image qualities (e.g., sampling rates). For example, a central zone (e.g., which may be referred to as the "foveated gaze zone" or "FGZ") may be rendered using the max sampling rate of the display (e.g., N rays each pixel). In contrast, the next zone out (e.g., the parafoveal zone) may be sampled at half the display's resolution in each dimension and the next zone out (e.g., peripheral or background zone) may have ⅕ of the display's resolution in each dimension. The zones are typically predetermined to be of constant size based on an assumed or calculated maximum movement of an eye expected within a given time period.

The assumptions that underlie the current usage of fixed-size FGZs may be inaccurate when the displayed content includes text or similar symbols representing alphabets condensing a system of orthography. The oculomotor dynamics exhibited during the reading of text is known to be substantially different than during viewing graphical or pictorial scenes and images. Such dynamics while reading text may not be smooth. The gaze may include saccades (e.g., movements of the eye) that include jumps by characters, words or phrases greater than 100 degrees per second. Saccade length and the durations of eye fixation (e.g., points where the eye does not move) may be influenced by preview benefits obtained from the user's parafoveal vision. Some evidence may suggest that saccade lengths during reading may be correlated approximately with characters with little or no influence from text size, e.g., 50% of saccades may be within 8 characters of the current gaze direction regardless of text size, 95% of saccades may be within 14 characters of the current gaze location regardless of text size, etc. For large text, a constant size FGZ may not provide sufficient characters around the user's gaze direction to account for potential user saccades. In other words, it appears that in some cases, the FGZ for reading text should be larger than for graphics to avoid noticeable resolution issues.

Implementations disclosed herein recognize that existing foveated rendering techniques may provide noticeable issues or may otherwise fail to accurately and efficiently provide foveated rendering of environments that include text. Implementations disclosed herein provide dynamic foveation techniques to address these and other issues. Accordingly, various implementations disclosed herein dynamically-size zones used in foveated rendering of content that includes text. In some implementations, this involves adjusting the size of a first zone, e.g., a foveated gaze zone (FGZ), based on the apparent size of text from a viewpoint. For example, a FGZ may be increased or decreased in width, height, diameter, or other size attribute based on determining an angle subtended by one or more individual glyphs of the text from the viewpoint. In some implementations, zones used in foveated rendering are sized based on the text font size, the virtual distance of the text, the user's eye motion (e.g., reading direction), font complexity, or even language (e.g., English, Hebrew, Arabic, etc.). In some implementations, zones used in foveated rendering are different for text than for other content. For example, a text foveal zone may be larger than a graphics foveal zone used for images of a given computer-generated reality (CGR) environment.

Various implementations disclosed herein additionally or alternatively use different text rendering algorithms for different regions of an image based on whether the respective region is in a particular foveal zone (e.g., inside a foveal zone or outside the foveal zone). In some implementations, an algorithm fidelity control method involves using SDF caching, vector text for cache generation and 2D fonts, and 2D fonts on a periphery.

Some implementations apply criteria to select a text-rendering algorithm for use in text rendering in CGR environments. These implementations may select the text-rendering algorithm to use for a glyph or part of a glyph within text based on a relationship between (a) the rendering resolution of a portion of an image corresponding to the part of the glyph and (b) the size that the part of the glyph will occupy in the image. Thus, an "e" in the FGZ may be rendered using an expensive algorithm while the same "e" of the same size in the parafoveal zone may be rendered using an inexpensive algorithm.

In some implementations, while a user is experiencing a CGR environment, as the user moves closer and further away from a world-locked text field, the angle subtended by individual glyphs increases or decreases respectively. The implication may be that the number of physical display pixels covered by the glyphs increases/decreases as well. For small angles, with fewer pixels per glyph, it may be desirable to use computationally cheaper text rendering algorithms, while for large angles, with more pixels per glyph, a better but more computationally-expensive algorithm should be used. In some implementations, a threshold value that optimizes such algorithm switching is determined and used. In some implementations, such thresholds are defined using a pixels-per-glyph equivalent metric.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and a device 120.

In some implementations, the controller 110 is configured to manage and coordinate a experience for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. In one example, the controller 110 is a local server located within the physical environment 105. In another example, the controller 110 is a remote server located outside of the physical environment 105 (e.g., a cloud server, central server, etc.). In some implementations, the controller 110 is communicatively coupled with the device 120 via one or more wired or wireless communication channels 144 (e.g., BLUETOOTH, IEEE 802.11x, IEEE 802.16x, IEEE 802.3x, etc.).

In some implementations, the device 120 is configured to present an environment to the user. In some implementations, the device 120 includes a suitable combination of software, firmware, and/or hardware. The device 120 is described in greater detail below with respect to FIG. 3. In some implementations, the functionalities of the controller 110 are provided by and/or combined with the device 120.

According to some implementations, the device 120 presents a computer-generated reality (CGR) environment to the user while the user is in the physical environment 105. A CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact.

For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In some implementations, the user wears the device 120 on his/her head. As such, the device 120 may include one or more displays provided to display content. For example, the device 120 may enclose the field-of-view of the user. In some implementations, the device 120 is a handheld electronic device (e.g., a smartphone or a tablet) configured to present content to the user. In some implementations, the device 120 is replaced with a chamber, enclosure, or room configured to present content in which the user does not wear or hold the device 120.

Figure 2:
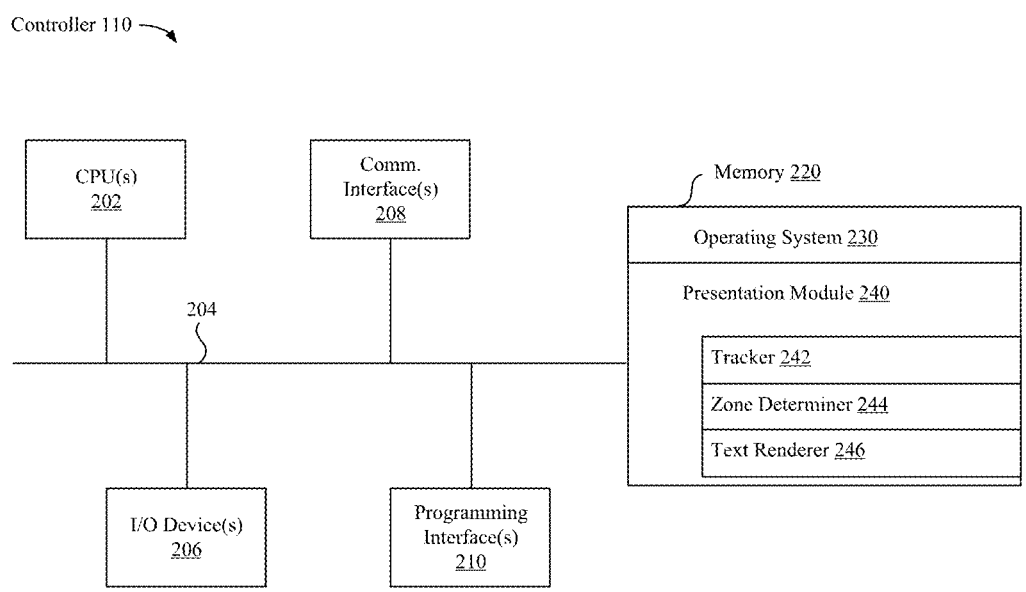
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and an experience module 240.

The operating system 230 includes procedures for handling various basic system services and for performing hardware dependent tasks. In some implementations, the presentation module 240 is configured to manage and coordinate one or more experiences for one or more users (e.g., a single experience for one or more users, or multiple experiences for respective groups of one or more users). To that end, in various implementations, the presentation module 240 includes a tracker 242, a zone determiner 244, and a text renderer 246.

In some implementations, the tracker 244 is configured to determine a gaze direction of a user via one or more of the techniques disclosed herein or another appropriate gaze tracking technique. To that end, in various implementations, the tracker 244 includes instructions and/or logic therefor, configured neural networks, and heuristics and metadata therefor.

In some implementations, the text renderer 246 is configured render text using one or more text rendering techniques via one or more of the techniques disclosed herein or other appropriate text rendering techniques. To that end, in various implementations, the text renderer 246 includes instructions and/or logic therefor, and heuristics and metadata therefor.

Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
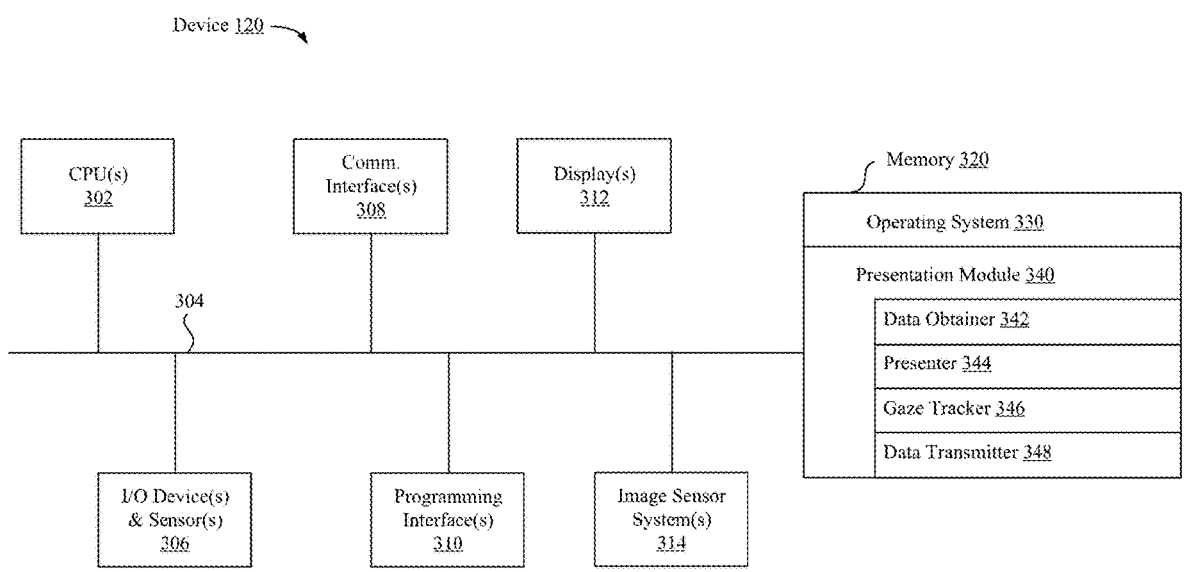
FIG. 3 is a block diagram of an example device in accordance with some implementations.

FIG. 3 is a block diagram of an example of the device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 310, one or more AR/VR displays 312, one or more interior and/or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 312 are configured to present the experience to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 312 correspond to diffractive, reflective, polarized, holographic, etc. waveguide displays. For example, the device 120 includes a single display. In another example, the device 120 includes an display for each eye of the user.

In some implementations, the one or more image sensor systems 314 are configured to obtain image data that corresponds to at least a portion of the face of the user that includes the eyes of the user. For example, the one or more image sensor systems 314 include one or more RGB cameras (e.g., with a complimentary metal-oxide-semiconductor (CMOS) image sensor or a charge-coupled device (CCD) image sensor), monochrome cameras, IR cameras, event-based cameras, and/or the like. In various implementations, the one or more image sensor systems 314 further include illumination sources that emit light upon the portion of the face of the user, such as a flash or a glint source.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330, an AR/VR presentation module 340, and a user data store 360.

The operating system 330 includes procedures for handling various basic system services and for performing hardware dependent tasks. In some implementations, the presentation module 340 is configured to present content to the user via the one or more displays 312. To that end, in various implementations, the presentation module 340 includes a tracker 342, a zone determiner 344, and a text renderer 346.

In some implementations, the tracker 344 is configured to determine a gaze direction of a user via one or more of the techniques disclosed herein or another appropriate gaze tracking technique. To that end, in various implementations, the tracker 344 includes instructions and/or logic therefor, configured neural networks, and heuristics and metadata therefor.

In some implementations, the text renderer 346 is configured render text using one or more text rendering techniques via one or more of the techniques disclosed herein or other appropriate text rendering techniques. To that end, in various implementations, the text renderer 346 includes instructions and/or logic therefor, and heuristics and metadata therefor.

Although these elements are shown as residing on a single device (e.g., the device 120), it should be understood that in other implementations, any combination of the elements may be located in separate computing devices. Moreover, FIG. 3 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Device 120 of FIG. 3 may be implemented as a head-mounted device.

Figure 4:
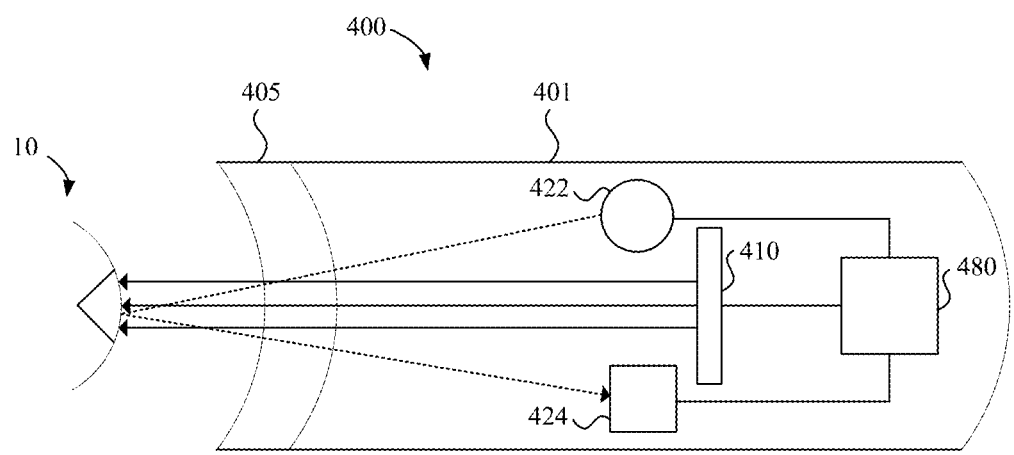
FIG. 4 is a block diagram of an example head-mounted device (HMD) in accordance with some implementations.

FIG. 4 illustrates a block diagram of a head-mounted device 400 in accordance with some implementations. The head-mounted device 400 includes a housing 401 (or enclosure) that houses various components of the head-mounted device 400. The housing 401 includes (or is coupled to) an eye pad 405 disposed at a proximal (to the user 10) end of the housing 401. In various implementations, the eye pad 405 is a plastic or rubber piece that comfortably and snugly keeps the head-mounted device 400 in the proper position on the face of the user 10 (e.g., surrounding the eye of the user 10).

The housing 401 houses a display 410 that displays an image, emitting light towards onto the eye of a user 10. In various implementations, the display 410 emits the light through an eyepiece (not shown) that refracts the light emitted by the display 410, making the display appear to the user 10 to be at a virtual distance farther than the actual distance from the eye to the display 410. For the user to be able to focus on the display 410, in various implementations, the virtual distance is at least greater than a minimum focal distance of the eye (e.g., 7 cm). Further, in order to provide a better user experience, in various implementations, the virtual distance is greater than 1 meter.

Although FIG. 4 illustrates a head-mounted device 400 including a display 410 and an eye pad 405, in various implementations, the head-mounted device 400 does not include a display 410 or includes an optical see-through display without including an eye pad 405.

The housing 401 also houses a gaze tracking system including one or more light sources 422, camera 424, and a controller 480. The one or more light sources 422 emit light onto the eye of the user 10 that reflects light (e.g., a directional beam) that can be detected by the sensor 424. Based on the reflected glint(s), the controller 480 can determine a gaze direction of the user 10. As another example, the controller 480 can determine a pupil center, a pupil size, or a point of regard. Thus, in various implementations, the light is emitted by the one or more light sources 422, reflects off the eye of the user 10, and is detected by the sensor 424. In various implementations, the light from the eye of the user 10 is reflected off a hot mirror or passed through an eyepiece before reaching the sensor 424.

The display 410 may emit light in a first wavelength range and the one or more light sources 422 may emit light in a second wavelength range. Similarly, the sensor 424 may detect light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In various implementations, gaze tracking (or, in particular, a determined gaze direction) is used to enable user interaction (e.g., the user 10 selects an option on the display 410 by looking at it), provide foveated rendering (e.g., present a higher resolution in an area of the display 410 the user 10 is looking at and a lower resolution elsewhere on the display 410), and/or reduce geometric distortion (e.g., in 3D rendering of objects on the display 410).

In various implementations, the one or more light sources 422 emit light towards the eye of the user which reflects in the form of one or more glints. When a glint, reflected by the eye and detected by the sensor 424, is analyzed, the identity of the glint can be determined. In various implementations, the one or more light sources 422 include multiple lights sources.

In various implementations, the one or more light sources 422 modulate the intensity of emitted light with different modulation frequencies. For example, in various implementations, a first light source of the one or more light sources 422 is modulated at a first frequency (e.g., 600 Hz) and a second light source of the one or more light sources 422 is modulated at a second frequency (e.g., 500 Hz).

In various implementations, the one or more light sources 422 modulate the intensity of emitted light according to a presented user interface (e.g., what is displayed on the display 410). For example, if the display 410 is unusually bright (e.g., a video of an explosion is being displayed), the one or more light sources 422 increase the intensity of the emitted light to compensate for potential interference from the display 410.

In various implementations, the sensor 424 is a frame/shutter-based camera that, at a particular point in time or multiple points in time at a frame rate, generates an image of the eye of the user 10. Each image includes a matrix of pixel values corresponding to pixels of the image which correspond to locations of a matrix of light sensors of the camera.

In various implementations, the camera 424 is an event camera comprising a plurality of light sensors (e.g., a matrix of light sensors) at a plurality of respective locations that, in response to a particular light sensor detecting a change in intensity of light, generates an event message indicating a particular location of the particular light sensor.

In various implementations, the camera 424 may be a combination of a frame/shutter-based camera and a plurality of light sensors and photodetectors with optical attachments at a plurality of respective locations that generate both an image of the eye and a voltage deflection based on the movement of the eye.

In various implementations, a user's gaze direction is determined based on one or more glints reflected from the user's eye, reflections off the user's retina, and/or reflections from the user's face or head or from changes in voltages detected from optical sensors. In some implementations, the user's gaze direction is determined by identifying two or more points on a vector associated with the user's gaze direction, for example, by determining a pupil center and a cornea center or eye center and connecting the points with a vector direction.

Dynamic Foveation Zone Sizing Techniques

Figure 5:
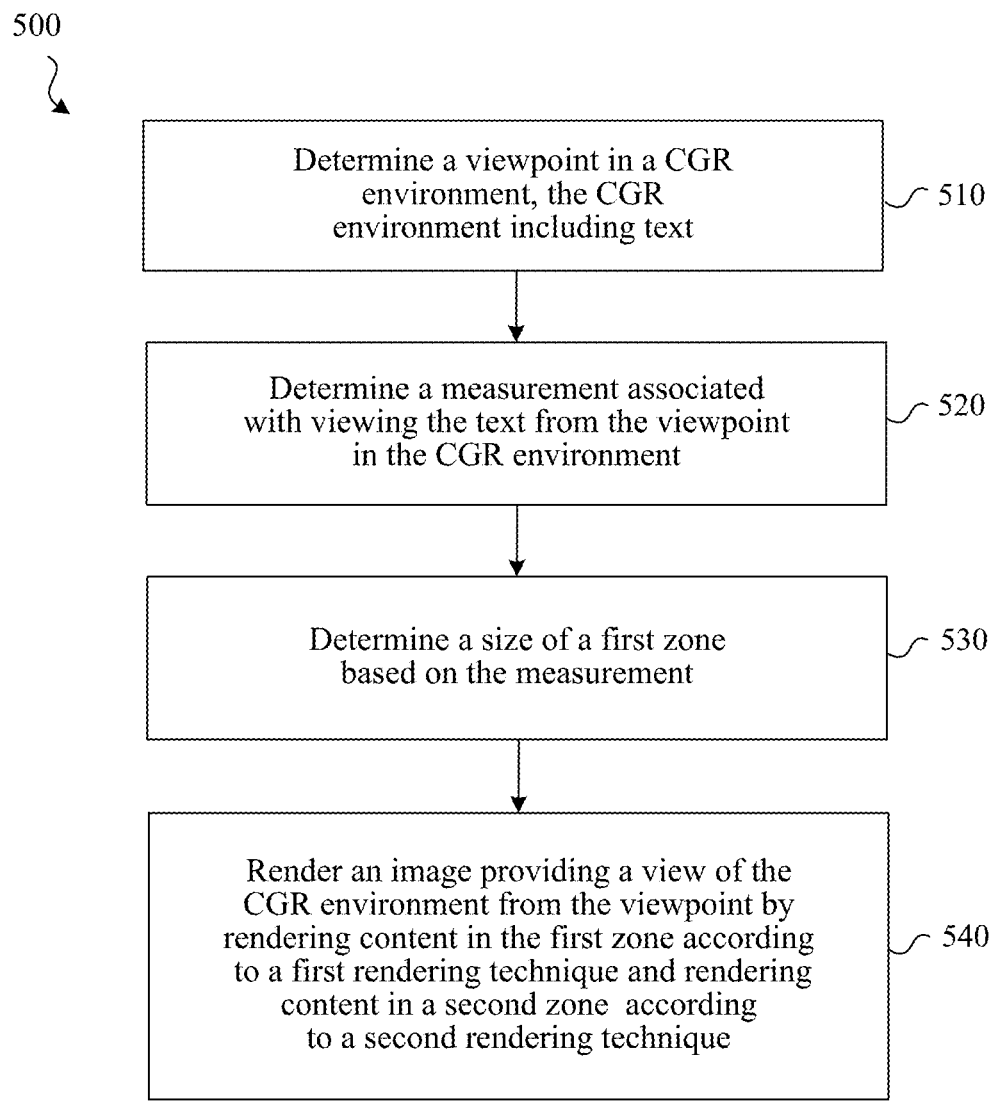
FIG. 5 is a flowchart representation of an exemplary method that dynamically-sizes zones used in foveated rendering of content that includes text.

FIG. 5 is a flowchart representation of an exemplary method 500 that dynamically-sizes zones used in foveated rendering of content that includes text. In some implementations, the method 500 is performed by a device (e.g., controller 110 of FIGS. 1 and 2), such as a mobile device, desktop, laptop, or server device. The method 500 can be performed on a device (e.g., device 120 of FIGS. 1 and 3) that has a screen for displaying 2D images and/or a screen for viewing stereoscopic images such as a head-mounted display (HMD). In some implementations, the method 500 is performed by processing logic, including hardware, firmware, software, or a combination thereof. In some implementations, the method 500 is performed by a processor executing code stored in a non-transitory computer-readable medium (e.g., a memory).

At block 510, the method 500 determines a viewpoint of CGR environment that includes text. In some implementations, a viewpoint is determined based on tracking the pose (e.g., position and orientation) of a head mounted device (HMD) or other device that will present a view of the CGR environment. For example, a HMD may include internal sensors or be used with external sensors that track the HMDs current position and orientation in a 3D coordinate system over time. The tracking may involve computer vision, visual inertial odometry (VIO), simultaneous localization and mapping (SLAM), or any other appropriate technique. In some implementations, the viewpoint is associated with the actual pose of a real device. In some implementations, the viewpoint is associated with a virtual pose of a virtual camera.

At block 520, the method 500 determines a measurement associated with viewing the text from the viewpoint in the CGR environment. For example, the method may determine an angle subtended by an individual glyph, an angle subtended by the average of multiple individual glyphs, or the maximum angle subtended by multiple individual glyphs. In some implementations, the measurement is an angle subtended by the spacing between lines of the text. Such angles may depend upon the distance of the text from a viewpoint and the text size and thus provides a measure of the apparent size of the text from the viewpoint. In some implementations, the measurement is an angle subtended by a current gaze position and an end of a current line of the text. In some implementations, the measurement may be incorporated as part of the graphics processor where the processor is aware of the number of pixels required to cover the desired glyph or orthography.

At block 530, the method 500 determines a size (e.g., diameter, width, height, etc.) of a first zone based on the measurement. For example, the width of a FGZ centered on the user's current gaze direction may be based on the size of a predetermined number of glyphs, e.g., the FGZ width may correspond to the width of a predetermined number of glyphs (e.g., 28 glyphs) given the determined or average size of glyphs in the text. Accordingly, for different glyph sizes (e.g., corresponding to different sizes in an image plane), the FGZ will be given different sizes corresponding to the width of the predetermined number of glyphs. For many foveated rendering applications one or more zones are centered or otherwise positioned based on a user's current (or expected) gaze direction, which may be estimated using the techniques disclosed herein or any other appropriate technique.

In some implementations, the measurement is an angle subtended by one or more glyphs that is used to adjust the horizontal size of a FGZ for horizontal text. In some implementations, the measurement is an angle subtended by one or more glyphs that is used to adjust the vertical size of a FGZ for vertical text.

In some implementations, the measurement is an angle subtended by the spacing between lines of the text that is used to adjust the vertical size of a FGZ for horizontal text. In some implementations, the measurement is an angle subtended by the spacing between lines of the text that is used to adjust the horizontal size of a FGZ for vertical text.

In some implementations, the size of the first zone is additionally or alternatively determined based on a user-specific attribute. For example, the method may identify a user attribute such as the user's average saccade size or gaze jump during reading and adjust the size of the first zone accordingly. For example, if the user's saccades are within 10 characters 95% of the time, an FGZ zone may be set to 20 characters wide (e.g., 10 characters on each side of the current gaze direction position). In some implementations, user-data for a time period, e.g., minutes, hours, days, months, years, lifetime, etc., is tracked and the system learns (e.g., using a machine learning model) to predict how the user will behave based on this historical data.

In some implementations, the size of the first zone is additionally or alternatively based on estimates in mixed graphics/text content to account for text rendering. The visual salience of a rendered image may be used to estimate, e.g., using an algorithm, how a user's eye may move from one region in the image to another.

At block 540, the method renders an image providing a view of the CGR environment from the viewpoint by rendering content in the first zone (e.g., foveated gaze zone/FGZ) according to a first rendering technique and rendering content in a second zone (e.g., the parafoveal zone) according to a second rendering technique. The first zone is distinct from the second zone and the first rendering technique is different from the second rendering technique. In some implementations, the first rendering technique uses a greater sampling rate than the second rendering technique. In some implementations, the first rendering technique renders text using a more expensive text-rendering technique than the second rendering technique.

Since the size of the FGZ depends on the measurement associated with viewing the text (e.g., upon the angle subtended by one or more individual glyphs from the viewpoint), the size of the FGZ is variable and may adjust depending upon the particular circumstances (e.g., given the current text size and current viewpoint). Moreover, rendering in different zones using different rendering techniques enables foveated rendering. Since the size of the zones may adjust over time as circumstances (e.g., text size or viewpoint) change, the foveated rendering is dynamic. Accordingly, method 500 may involve dynamically adjusting the size of the first zone for rendering additional images providing views of the CGR environment based on additional measurements associated with viewing the text in the CGR environment.

In some implementations, the method 500 renders content in a third zone according to a third rendering technique. The third zone is distinct from the first zone and the second zone and the third rendering technique is different from the first rendering technique and the second rendering technique. In some implementations, the size of the second zone, e.g., the location of boundaries between the second zone and each of the first and third zones, may be based on the measurement associated with viewing the text from the viewpoint in the CGR environment. The size of the third zone, e.g., the location of a boundary between the second zone and the third zone may be based on the measurement associated with viewing the text from the viewpoint in the CGR environment. In some implementations, multiple zones are used. In some implementations, the number of zones is based on a selected tile size in "tile-based rendering"; 32 pixels for example. For example, use of a panel of size 1280×1280 may result in 40×40, or 1600 tiles, without foveation. In one example, tiles of 27×27 with foveation would result in 13 (e.g., (27−1)/2)) zones.

Figure 6:
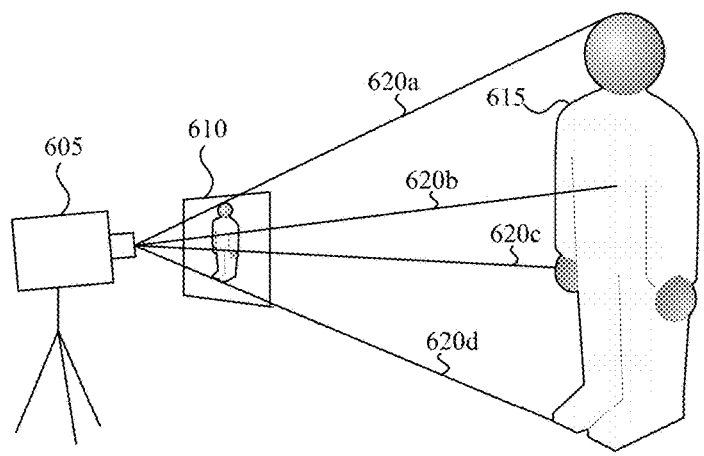
FIG. 6 is a block diagram illustrating a viewpoint used to generate an image of a CGR environment.

FIG. 6 illustrates a viewpoint used to generate an image of a CGR environment. In this example, a viewpoint 605 is used to generate an image on image plane 610 of the CGR environment that includes a 3D representation of a person 615. In this example, rays 620*a*, 620*b*, 620*c*, and 620*d* are projected from the viewpoint 605 through an image plane 610 corresponding to the image that is being generated to provide the view of the CGR environment. The pixel values of an image corresponding to the image plane 610 are determined based on where the rays pass through the image plane 610 (e.g., identifying one or more pixels) and where the rays intersect with the CGR environment (e.g., identifying an attribute such as color for the one or more pixels). Using rays to determine pixel values is one exemplary rendering technique. The number of rays used to determine pixel values for the image plane may depend upon a rendering resolution of the part of the corresponding portion of the image/image plane (e.g., the number of rendering pixels in that portion of the image/image plane). For portions having relatively more rendering pixels a relatively more expensive rendering technique (e.g., using relatively more rays) may be used. Other rendering techniques of varying computational expense may be used.

Figure 7:
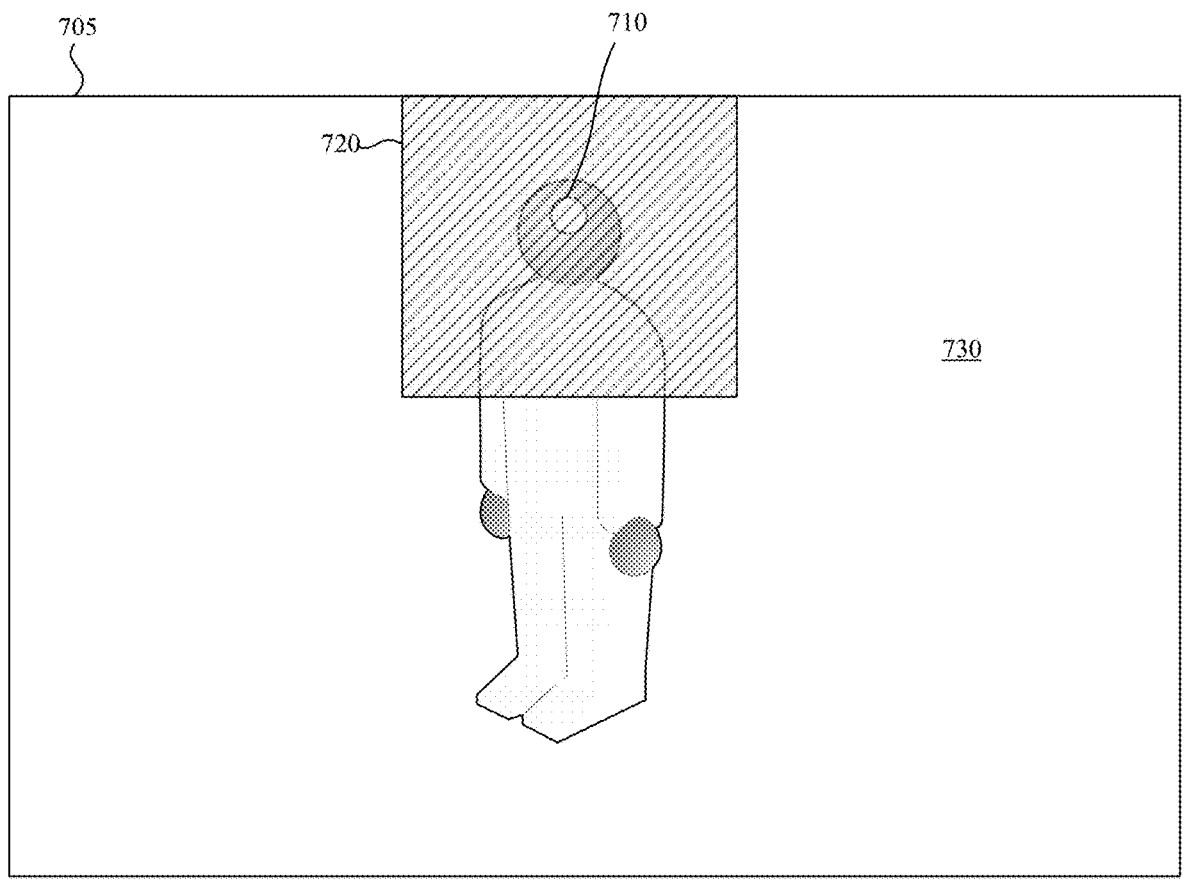
FIG. 7 is a block diagram illustrating zones of an image corresponding to the image plane of FIG. 6.

FIG. 7 illustrates rendering zones of an image 705 corresponding to the image plane 610 of FIG. 6. In this example, image 705 is based on image plane 610 and includes a first zone 720 (e.g., a foveated gaze zone (FGZ)) that is based on the current gaze direction point 710. In some implementations, the first zone's size is determined by determining distances away from the gaze direction point 710 in directions and amounts based on the content of the CGR environment. FIG. 7 also illustrates a second zone 730 outside of and thus distinct from the first zone 720. Foveated rendering may involve rendering content within the first zone 720 using a different rendering technique than rendering content within the second zone 730.

Figure 8:
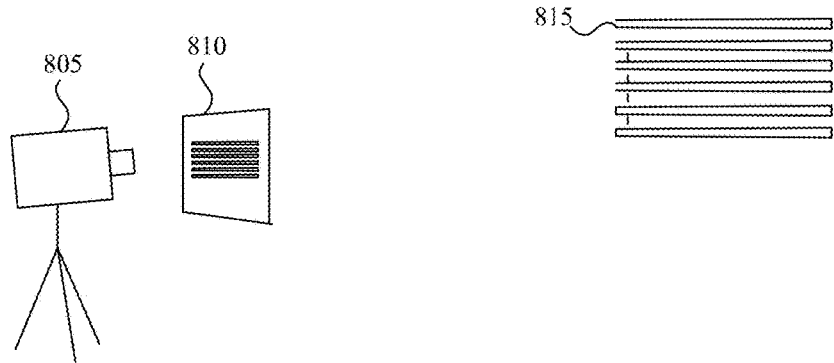
FIG. 8 is a block diagram illustrating a viewpoint used to generate an image of a CGR environment that includes text.

FIG. 8 illustrates a viewpoint used to generate an image of a CGR environment that includes text. In this example, a viewpoint 805 is used to generate an image on image plane 810 of a CGR environment that includes text 815. The pixel values of an image corresponding to the image plane are determined based on a view of the CGR environment (e.g., identifying an attribute such as color for the pixels) from the viewpoint 815.

FIG. 8 illustrates a viewpoint used to generate an image of a CGR environment that includes text. In this example, a viewpoint 805 is used to generate an image on image plane 810 of a CGR environment that includes text 815. The pixel values of an image corresponding to the image plane are determined based on a view of the CGR environment (e.g., identifying an attribute such as color for the pixels) from the viewpoint 805.

Figure 9:
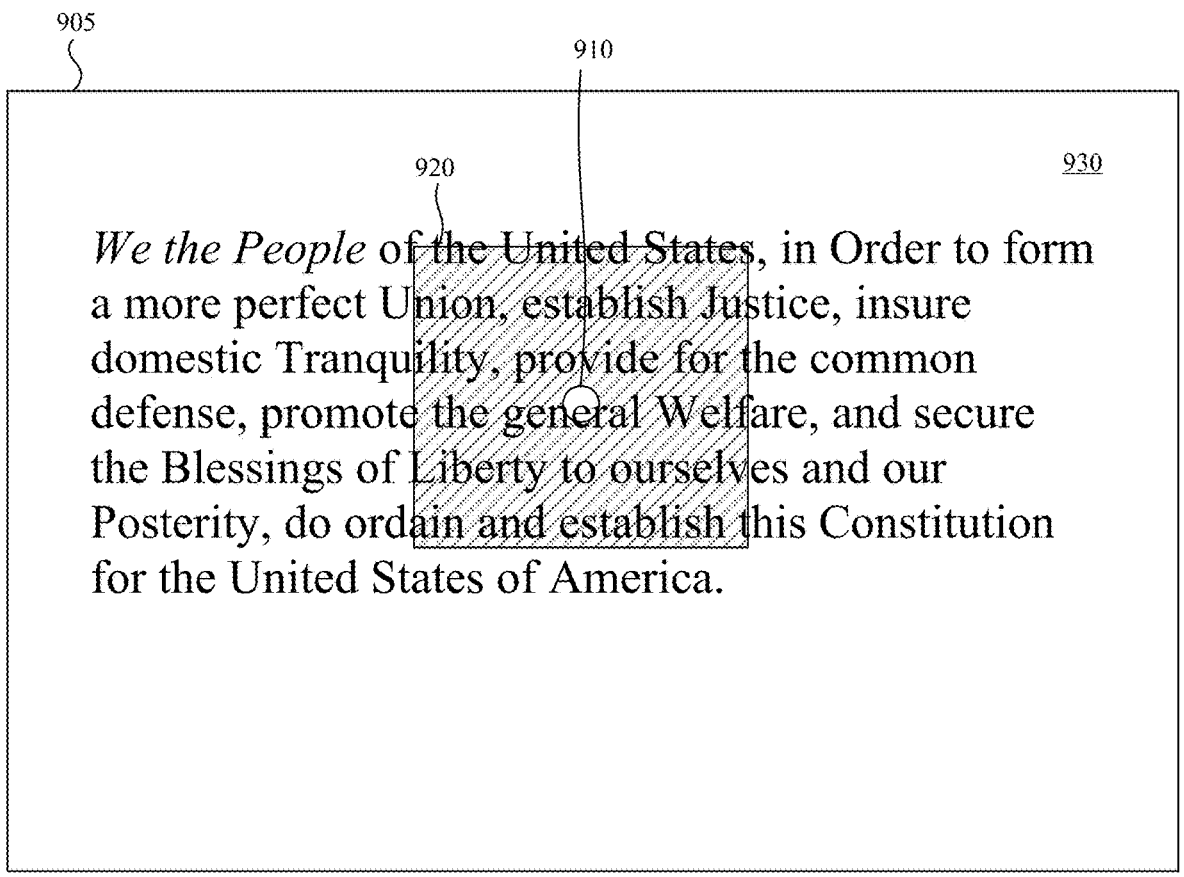
FIG. 9 is a block diagram illustrating zones of an image corresponding to the image plane of FIG. 8 according to certain implementations.

FIG. 9 illustrates rendering zones of an image 905 corresponding to the image plane 810 of FIG. 8. In this example, image 905 is based on image plane 810 and includes a first zone 920 (e.g., a foveated gaze zone (FGZ)) that is based on the current gaze direction point 910. The second zone 930 is outside of and thus distinct from the first zone 920. Foveated rendering may involve rendering content with the first zone 920 using a different rendering technique than rendering content in the second zone 930. In this example, the first zone 920 size is determined using fixed size parameters that may be based on assumptions appropriate for graphic content but not text content. Accordingly, the user may saccade to gaze at and read a word outside of the first zone 920 (e.g., text in the second zone 930) and have an undesirable experience. For example, the user may notice, be distracted by, or otherwise have a negative experience due to a perceived difference in the rendered text to which the user's eyes jumped.

In some implementations, the first zone 1020 is determined by determining distances away from the gaze direction point 1010 in directions and amounts based on the content of the CGR environment. For example, the horizontal extension to the left and/or right of the gaze direction point 1010 and/or the vertical extension above or below the gaze direction point 1010 may be determined based on text in the CGR environment and the user's viewpoint in relation to that text. In this example, the horizontal extension to the left and right of the gaze direction point 1010 is determined to include a threshold number of characters/text glyphs (e.g., "a", "b", "?", " ", etc.). For example, the FGZ may be sized to include 14 characters to the left and right of the gaze direction point 1010. Note that a predetermined number of character threshold accounts for reading saccades and may also account for a user's preview benefit window. In the circumstance of text that is read vertically (e.g., with consecutive characters or symbols above and below one another in the direction of reading), the vertical extension above or below the gaze direction point 1010 may similarly be based on a threshold number of characters/text glyphs.

Figure 10:
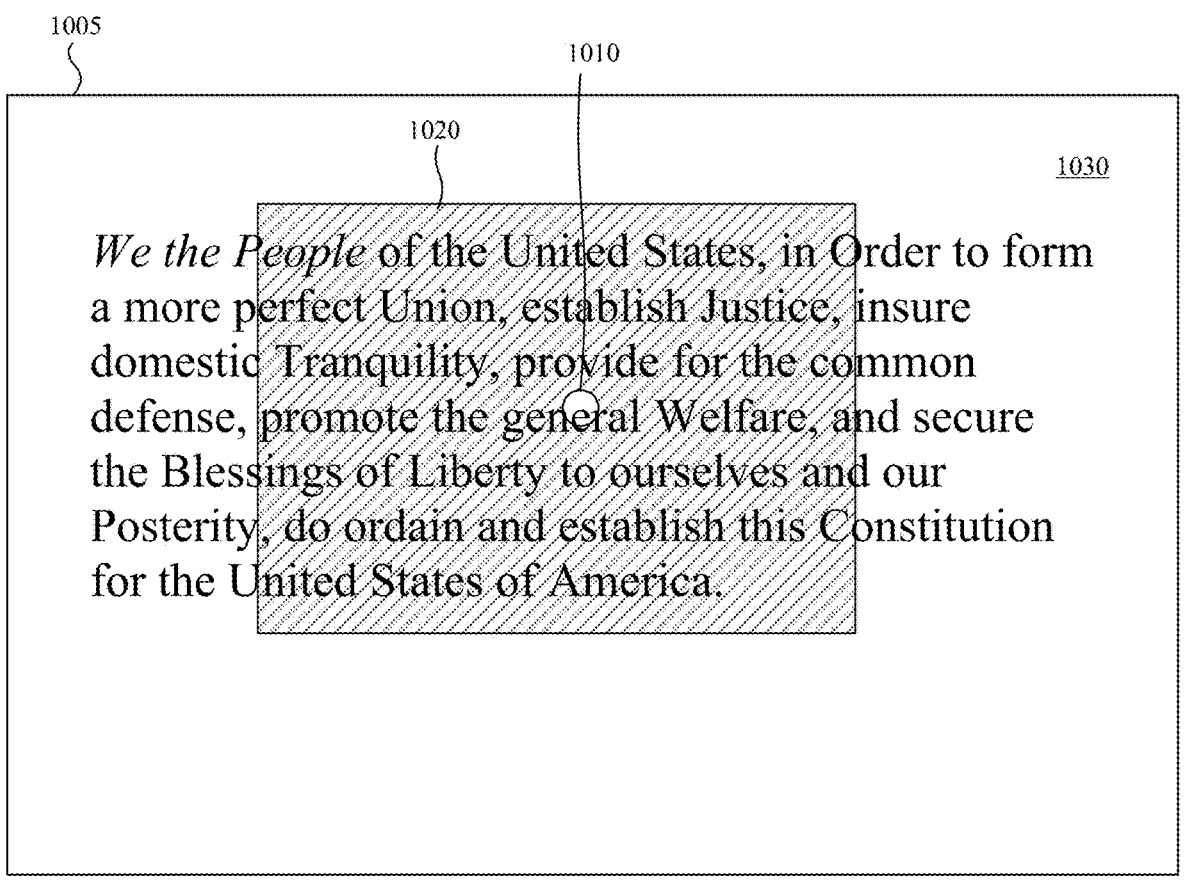
FIG. 10 is a block diagram illustrating zones sized based on text viewing circumstances according to certain implementations.

For horizontal text, the vertical extension above or below the gaze direction point 1010 may be based on other text characteristics (e.g., to include a threshold number of text lines/rows—which will depend upon line spacing—or based on the beginning or ending of a paragraph or other block of text). In the example of FIG. 10, the vertical size of the FGZ is based on the beginning and ending of the text. Similarly, for vertical text, the horizontal extension to the left and right of the gaze direction point 1010 may be based on other text characteristics (e.g., to include a threshold number of text lines/columns—which will depend upon line spacing—or be based on the beginning or ending of a paragraph or other block of text).

Figure 11:
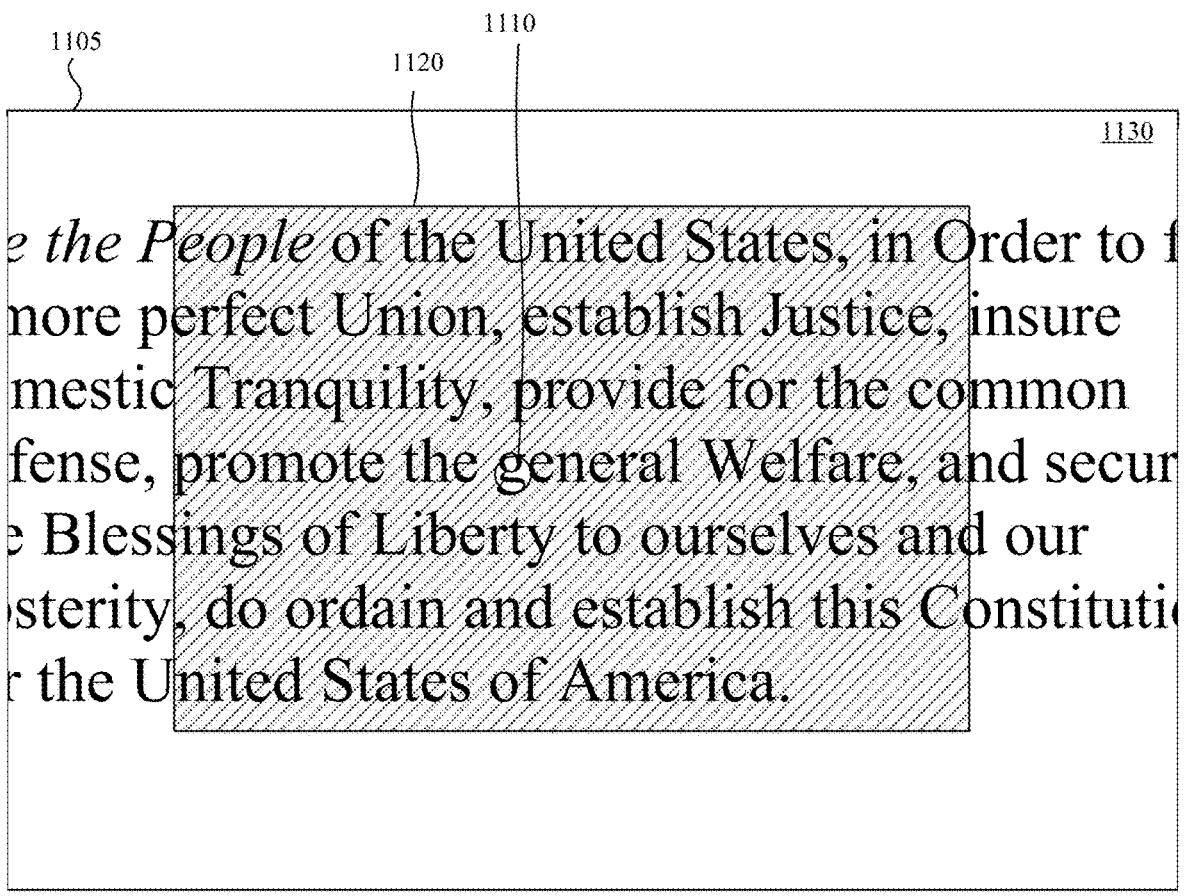
FIG. 11 is a block diagram illustrating zones sized based on text viewing circumstances according to certain implementations.

FIG. 11 illustrates foveated rendering zones sized based on text of the image of the CGR environment in an alternative circumstance. In this example, the text is relatively larger (when viewed from the viewpoint) compared to the text of FIG. 10. In this example, image 1105 is based on image plane 810 and includes a first zone 1120 (e.g., a foveated gaze zone (FGZ)) that is based on the current gaze direction point 1110. The second zone 1130 is outside of and thus distinct from the first zone 1120. Foveated rendering may involve rendering content with the first zone 1120 using a different rendering technique than rendering content in the second zone 1130. In this example, the horizontal extension to the left and right of the gaze direction point 1110 is determined to include a threshold number of characters/text glyphs (e.g., "a", "b", "?", " ", etc.). For example, the FGZ may be sized to include 14 characters to the left and right of the gaze direction point 1110. The first zone 1120 of FIG. 11 is accordingly relatively larger than the first zone 1020 of FIG. 10.

Figure 12:
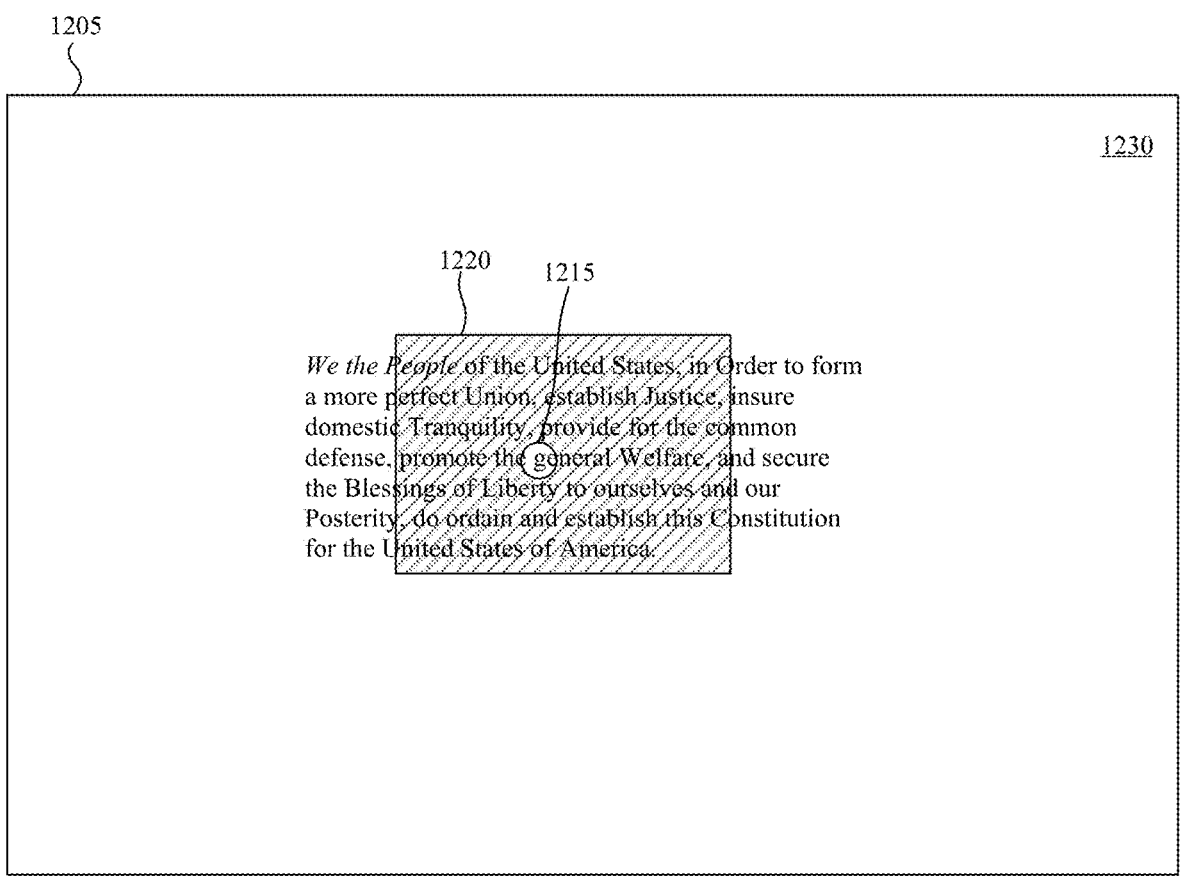
FIG. 12 is a block diagram illustrating zones sized based on text viewing circumstances according to certain implementations.

FIG. 12 illustrates foveated rendering zones sized based on text of the image of the CGR environment in an alternative circumstance. In this example, the text is relatively smaller (when viewed from the viewpoint) compared to the text of FIGS. 10 and 11. In this example, image 1205 is based on image plane 810 and includes a first zone 1220 (e.g., a foveated gaze zone (FGZ)) that is based on the current gaze direction point 1210. The second zone 1230 is outside of and thus distinct from the first zone 1220. Foveated rendering may involve rendering content with the first zone 1220 using a different rendering technique than rendering content in the second zone 1230. In this example, the horizontal extension to the left and right of the gaze direction point 1210 is determined to include a threshold number of characters/text glyphs (e.g., "a", "b", "?", " ", etc.). For example, the FGZ may be sized to include 14 characters to the left and right of the gaze direction point 1210. The first zone 1220 of FIG. 12 is accordingly relatively smaller than the first zone 1020 of FIG. 10 and the first zone 1120 of FIG. 11.

Text Rendering Algorithm Selection Techniques

Various implementations disclosed herein include devices, systems, and methods that select a text-rendering algorithm based on a relationship between (a) the rendering resolution of a portion of an image corresponding to a part of a glyph and (b) the size that the part of the glyph will occupy in the image. Thus, an "e" in the FGZ may be rendered using an expensive algorithm while the same "e" of the same size in the parafoveal zone may be rendered using an inexpensive algorithm.

Figure 13:
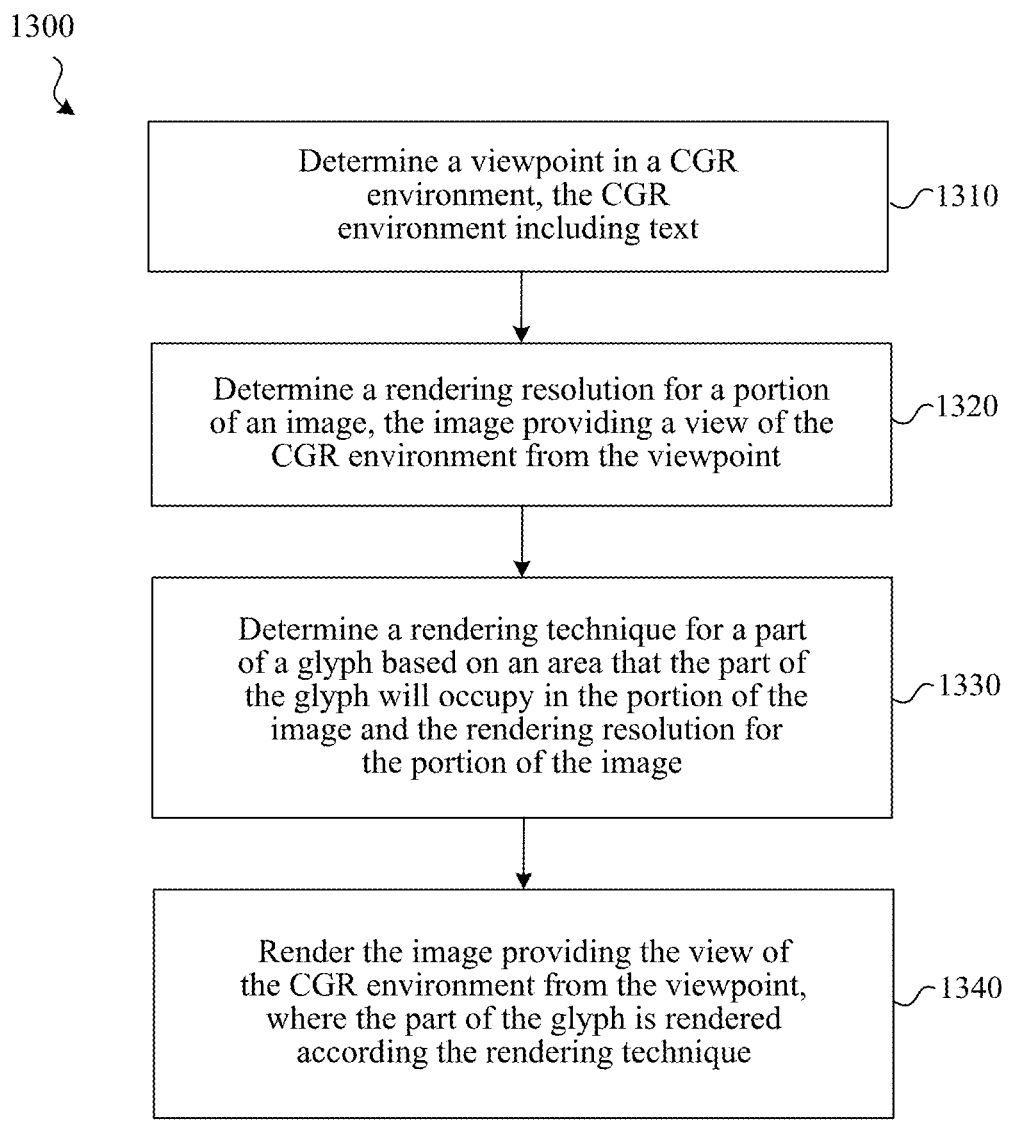
FIG. 13 is a flowchart representation of an exemplary method that select a text-rendering algorithm.

FIG. 13 is a flowchart representation of an exemplary method 1300 that select a text-rendering algorithm. In some implementations, the method 1300 is performed by a device (e.g., controller 110 of FIGS. 1 and 2), such as a mobile device, desktop, laptop, or server device. The method 1300 can be performed on a device (e.g., device 120 of FIGS. 1 and 3) that has a screen for displaying 2D images and/or a screen for viewing stereoscopic images such as a head-mounted display (HMD). In some implementations, the method 1300 is performed by processing logic, including hardware, firmware, software, or a combination thereof. In some implementations, the method 1300 is performed by a processor executing code stored in a non-transitory computer-readable medium (e.g., a memory).

At block 1310, the method 1300 determines a viewpoint of a CGR environment that includes text. In some implementations, a viewpoint is determined based on tracking the pose (e.g., position and orientation) of a head mounted device (HMD) or other device that will present a view of the CGR environment. For example, a HMD may include internal sensors or be used with external sensors that track the HMDs current position and orientation in space over time. The tracking may involve computer vision, visual inertial odometry (VIO), simultaneous localization and mapping (SLAM), or any other appropriate technique. In some implementations, the viewpoint is associated with the actual pose of a real device. In some implementations, the viewpoint is associated with a virtual pose of a virtual camera.

At block 1320, the method 1300 determines a rendering resolution for a portion of an image that will provide a view of the CGR environment from the viewpoint. In some implementations, different zones of the image have different rendering resolutions. In some implementations, the portion of the image is all of the image and thus the image has a single zone and a single rendering resolution.

At block 1330, the method 1300 determines a rendering technique for a part of a glyph based on an area that the part of the glyph will occupy in the portion of the image and the rendering resolution for the portion of the image. For example, this may involve (a) determining an area of the image that the part of the glyph will occupy, (b) determining the number of rendering pixels of the area according to the rendering resolution, and (c) selecting the rendering technique based on the number of rendering pixels. For example, in a first circumstance, a part of a glyph will occupy an area of 10 pixels by 10 pixels (e.g., 100 pixels) and the rendering resolution the actual resolution. Accordingly, the method may determine that there are 100 rendering pixels and select a first rendering technique accordingly. In contrast, in a second circumstance, a part of a glyph will occupy the same area of 10 pixels by 10 pixels (e.g., 100 pixels) but the rendering resolution may be ½ of the actual resolution. Accordingly, the method may determine that there are 5 rendering pixels by 5 rendering pixels (e.g., 25 rendering pixels) and select a second rendering technique accordingly.

Figure 14:
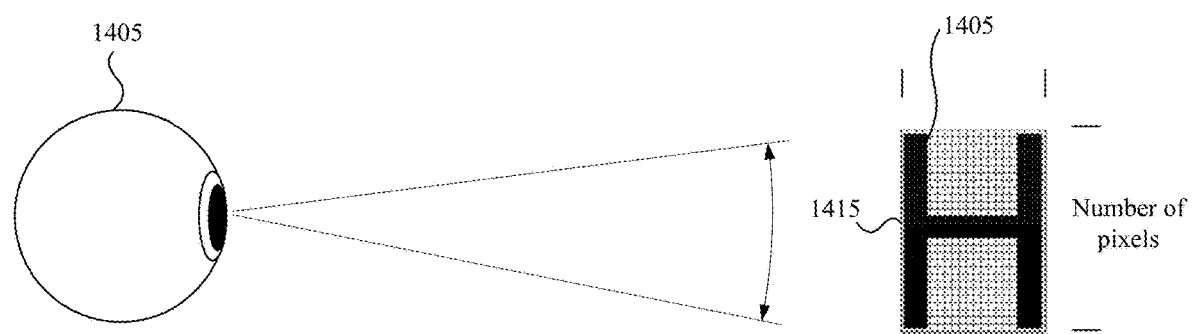
FIG. 14 is a block diagram illustrating a pixels per glyph determination.

In some implementations, the rendering technique is determined based on a pixels per glyph metric. FIG. 14 is a block diagram illustrating a pixels per glyph determination. In this example, a view of the CGR environment includes a view from viewpoint 1405 of glyph 1410. The angle θ 1415 is subtended by the glyph 1410 given the viewpoint 1405. Moreover, given the display resolution of 20 pixels per degree, a number of pixels (e.g., 20 are depicted in the example of FIG. 14) are required for the glyph such that it subtends Θ=1° at the eye, providing a value of 20 pixels/glyph in the horizontal axis for a horizontal, left-to-right, script. Pixels per glyph part may also be determined and compared with a threshold to determine an appropriate text rendering technique.

Generally, a first text rendering technique (e.g., a relatively more advanced algorithm or otherwise higher quality technique) may be used when the pixels/glyph metric or pixels/glyph part metric exceeds a threshold value and a second text rendering technique (e.g., a relatively less advanced algorithm or otherwise lower quality technique) may be used when the pixels/glyph metric or pixels/glyph part metric does not exceed the threshold value. In some implementations, more than two zones/rendering technique levels are used and multiple thresholds are used to select between the three or more rendering techniques.

The first rendering technique may provide a higher-quality appearance but may be more expensive in terms of computational requirements, execution time, or power consumption that the second rendering technique.

Text rendering algorithms may involve using vector text with runtime GPU signed distance field caching. For example, a vector text shader may be used to calculate analytic signed distance fields (SDFs) of transformed glyphs on the GPU at runtime. Text rendering algorithms may involve relatively slower offline image-based SDF calculations. Text rendering algorithms may involve rendering from cache using SDFs, which may be relatively fast compared to other techniques. SDFs may be generated perspective correct and 1:1 pixel:texel ratios. An SDF Cache may be used to generate perspectively-correct text with a minimal number of operations/pixel or operations/glyph.

In some implementations, user control may allow selection of thresholds that enable tradeoffs between texture resolution and cache update rate.

At block 1340, the method 1300 renders the image providing the view of the CGR environment from the viewpoint. The part of the glyph is rendered according the selected rendering technique. Moreover, different parts of the same glyph and parts of other glyphs may similarly be rendered according to rendering techniques selected based on the circumstances of each part. In this way, an image may be rendered by selectively using different text rendering techniques on different glyph parts that depend upon the circumstances (e.g., glyph size, glyph attributes, rendering resolution, etc.).

The method 1300 enables the use of different text-rendering algorithms for different text scales and circumstances. Different quality/performance tradeoffs may be made for different rendering resolutions. In other words, there may be different thresholds or crossover points used for different rendering resolutions.

In one implementation, three algorithm levels are used. A first level may be used for relatively large text, e.g., highly magnified text, for example using a Bezier mesh. This may avoid caching high resolution textures and may efficiently use fill rate. There may be no cost for pixels outside the triangulation and depth testing may be used on interior triangles for hidden surface removal. This may involve a unified solution with vector graphics. A second or intermediate level may be used for intermediate text may involve vector text (with SDF caching). This may provide high quality antialiasing and low geometric complexity per pixel (e.g., one quad per glyph). This may involve tunable performance/quality via caching. Cache may be used on the device. A third level may be used for relatively small text and involve a text rendering technique that is highly minified (e.g., using a pre-rasterized text atlas). The curve density may be too high for analytic schemes. High performance may be provided using a single fragment shader and low geometric complexity. Supersampling may be used for higher quality. Such a technique may provide low resolution text using minimal texture memory.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at an electronic device having a processor:
   determining a viewpoint of a computer-generated reality (CGR) environment, the CGR environment comprising text;
   determining a measurement associated with viewing the text from the viewpoint in the CGR environment, wherein the measurement comprises an angle subtended by a portion of the text;
   determining a size of a first zone based on the measurement; and
   rendering an image providing a view of the CGR environment from the viewpoint by rendering content in the first zone according to a first rendering technique and rendering content in a second zone according to a second rendering technique, the first zone distinct from the second zone and the first rendering technique different from the second rendering technique.

2. The method of claim 1, wherein the measurement is an angle subtended by an individual glyph of the text.

3. The method of claim 1, wherein the measurement is a maximum angle subtended by all individual glyphs of the text.

4. The method of claim 1, wherein the size of the first zone is determined based on a predetermined number of glyphs.

5. The method of claim 1, wherein a width of the first zone is determined based on a predetermined number of glyphs.

6. The method of claim 1, further comprising dynamically adjusting the size of the first zone for rendering additional images providing views of the CGR environment based on additional measurements associated with viewing the text in the CGR environment.

7. The method of claim 1, wherein the viewpoint is determined based on tracking a pose of a device upon which the rendering is displayed.

8. The method of claim 1 wherein the first rendering technique uses a greater sampling rate than the second rendering technique.

9. The method of claim 1, wherein the rendering includes rendering content in a third zone according to a third rendering technique, the third zone distinct from the first zone and the second zone and the third rendering technique different from the first rendering technique and the second rendering technique.

10. The method of claim 9, wherein a size of the second zone or the third zone is based on the measurement.

11. The method of claim 1, wherein the measurement is an angle subtended by spacing between lines of the text.

12. The method of claim 1, wherein the measurement is an angle subtended by a current gaze position and an end of a current line of the text.

13. The method of claim 1 further comprising identifying a user attribute, wherein the size of the first zone is based on the user attribute.

14. The method of claim 1, wherein the size of the first zone is based on a visual saliency estimate.

15. A method comprising:
    at an electronic device having a processor:
    determining a viewpoint of a computer-generated reality (CGR) environment, the CGR environment comprising text;
    determining a rendering resolution for a portion of an image, the image providing a view of the CGR environment from the viewpoint;
    determining a rendering technique for a part of a glyph based on a size of an area that the part of the glyph will occupy in the portion of the image and the rendering resolution for the portion of the image; and
    rendering the image providing the view of the CGR environment from the viewpoint, wherein the part of the glyph is rendered according the rendering technique.

16. The method of claim 15, wherein different rendering resolutions are used in rendering different zones of the image.

17. The method of claim 15, wherein determining the rendering technique comprises:
    determining an area of the image that the part of the glyph will occupy;
    determining a number of rendering pixels of the area according to the rendering resolution; and selecting the rendering technique based on the number of rendering pixels.

18. The method of claim 15, wherein determining the rendering technique comprises selecting a first rendering technique based on determining that the rendering resolution exceeds a threshold.

19. The method of claim 15, wherein the rendering technique is determined by selecting a rendering technique from a plurality of different rendering techniques based on the area that the part of the glyph will occupy in the portion of the image and the rendering resolution for the portion of the image.

20. A device comprising:

a non-transitory computer-readable storage medium; and one or more processors coupled to the non-transitory computer-readable storage medium, wherein the non-transitory computer-readable storage medium comprises program instructions that, when executed on the one or more processors, cause a system to perform operations comprising:

determining a viewpoint of a computer-generated reality (CGR) environment, the CGR environment comprising text;

determining a measurement associated with viewing the text from the viewpoint in the CGR environment, wherein the measurement comprises an angle subtended by a portion of the text;

determining a size of a first zone based on the measurement; and rendering an image providing a view of the CGR environment from the viewpoint by rendering content in the first zone according to a first rendering technique and rendering content in a second zone according to a second rendering technique, the first zone distinct from the second zone and the first rendering technique different from the second rendering technique.

* * * * *

UNITED STATES PATENT AND TRADEMARK OFFICE
CERTIFICATE OF CORRECTION

PATENT NO. : 11,308,685 B2
APPLICATION NO. : 17/028887
DATED : April 19, 2022
INVENTOR(S) : Hazra et al.

It is certified that error appears in the above-identified patent and that said Letters Patent is hereby corrected as shown below:

In the Specification

Column 16, Lines 32-39:
"FIG. 8 illustrates a viewpoint used to generate an image . . . from the viewpoint 815." Should be deleted.

Column 16, between Lines 65 and 66, insert the paragraph:
-- In contrast, Figure 10 illustrates foveated rendering zones 1020, 1030 sized based on text of the image of Figure 8 according to certain implementations. In this example, image 1005 is based on image plane 810 and includes a first zone 1020 (e.g., a foveated gaze zone (FGZ)) that is based on the current gaze direction point 1010. The second zone 1030 is outside of and thus distinct from the first zone 1020. Foveated rendering may involve rendering content with the first zone 1020 using a different rendering technique than rendering content in the second zone 1030. --.

Signed and Sealed this
Nineteenth Day of July, 2022

Katherine Kelly Vidal
*Director of the United States Patent and Trademark Office*